United States Patent [19]

Lai

[11] Patent Number: 5,333,826
[45] Date of Patent: Aug. 2, 1994

[54] SADDLE SUPPORT MECHANISM
[75] Inventor: Ten-Yi Lai, Taichung Hsien, Taiwan
[73] Assignee: Accord Enterprise Corporation, Taipei, Taiwan
[21] Appl. No.: 183,765
[22] Filed: Jan. 21, 1994
[51] Int. Cl.$^5$ ............................................. B62J 1/08
[52] U.S. Cl. .................................. 248/229; 248/231.1; 248/231.3; 248/316.1; 403/389; 403/398; 297/215.14
[58] Field of Search ................ 248/225.31, 229, 231.1, 248/231.3, 316.1, 316.2, 316.4, 219.2; 403/385, 389, 395, 398, 399; 297/195.1, 215.14

[56] References Cited
U.S. PATENT DOCUMENTS 5,226,624 7/1993 Kingsbery ..................... 248/219.2
5,228,796 7/1993 Kao ............................. 248/231.3 X Primary Examiner—Blair M. Johnson
Attorney, Agent, or Firm—Bacon & Thomas

[57] ABSTRACT

A saddle support includes a post, two bases engaged in the post for supporting saddle wires and each has a tapered surface formed in the lower portion, two clamping members each having a flange for engaging with the saddle wires and a tapered surface for engaging with the tapered surfaces of the bases. A bolt is engaged through the clamping members and the bases for forcing the clamping members toward each other. The flanges of the clamping members are forced downward to engage with the saddle wires when the tapered surfaces are engaged with each other and when the clamping members are forced toward each other by the bolt.

3 Claims, 2 Drawing Sheets 5,333,826

SADDLE SUPPORT MECHANISM

BACKGROUND OF THE INVENTION

1. Field of the Invention

The present invention relates to a saddle of a bicycle, and more particularly to a saddle support mechanism.

2. Description of the Prior Art

Typical saddle support devices comprise a base having a member fixed thereon so as to fix the saddle frame or the saddle wires between the base and the member. However, normally, the saddle frame can not be stably retained in place and may become loose after long term of usage.

The present invention has arisen to mitigate and/or obviate the afore-described disadvantages of the conventional saddle support devices.

SUMMARY OF THE INVENTION

The primary objective of the present invention is to provide a saddle support mechanism with which the saddle frame can be stably supported in place.

In accordance with one aspect of the invention, there is provided a saddle support mechanism comprising a post including a hole laterally formed therein and having two end portions, two bases each including a stub formed thereon for engaging with the end portions of the hole, and each including a pair of ears extended away from the post for supporting saddle wires thereon. Each of the bases includes a lower portion having a first tapered surface formed therein, two clamping members slidingly disposed between the ears of the bases, respectively, and each including an upper portion having a flange formed thereon for engaging with the saddle wires and a lower portion having a second tapered surface formed therein for engaging with the first tapered surfaces of the bases. A bolt is engaged through the clamping members, the bases and the hole of the post in order to force the clamping members toward each other so as to fix the clamping members and the bases to the post. Also provided are means biased between the bases and the clamping members, respectively, the clamping members being caused to move downward relative to the bases when the first tapered surfaces are engaged with the second tapered surfaces, respectively, and when the clamping members are forced toward each other by the bolt, whereby, the flanges of the clamping members are forced to move downward relative to the bases in order to fix the saddle wires in place.

The stubs of the bases each include a square bore formed therein, and a beam includes a square cross section for engaging with the square bores of the stubs.

The end portions of the hole each include a first conical surface formed therein, each of the bases includes a second conical surface formed therein for engaging with the first conical surfaces respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
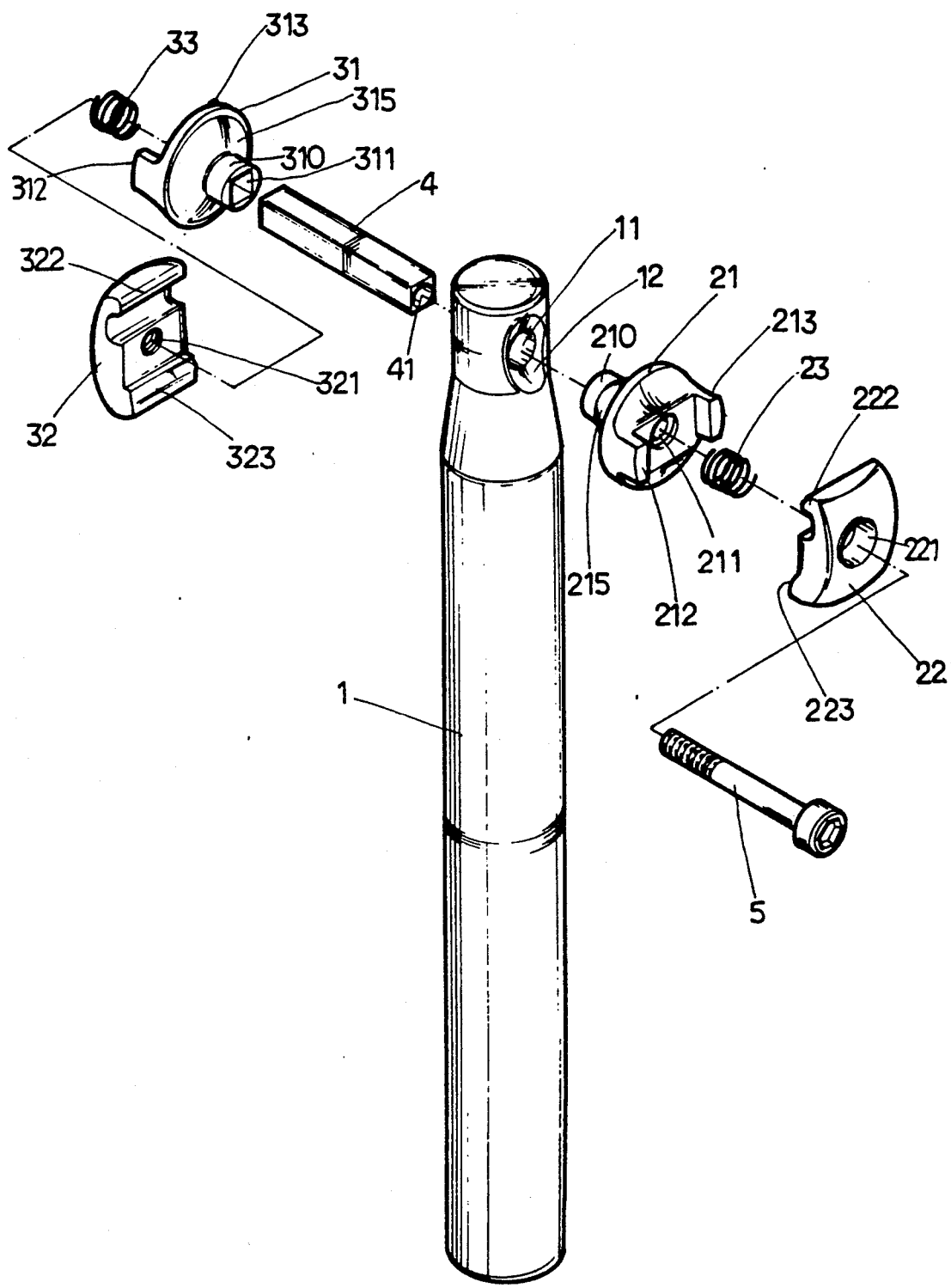
FIG. 1 is an exploded view of a saddle support mechanism in accordance with the present invention.
Figure 2:
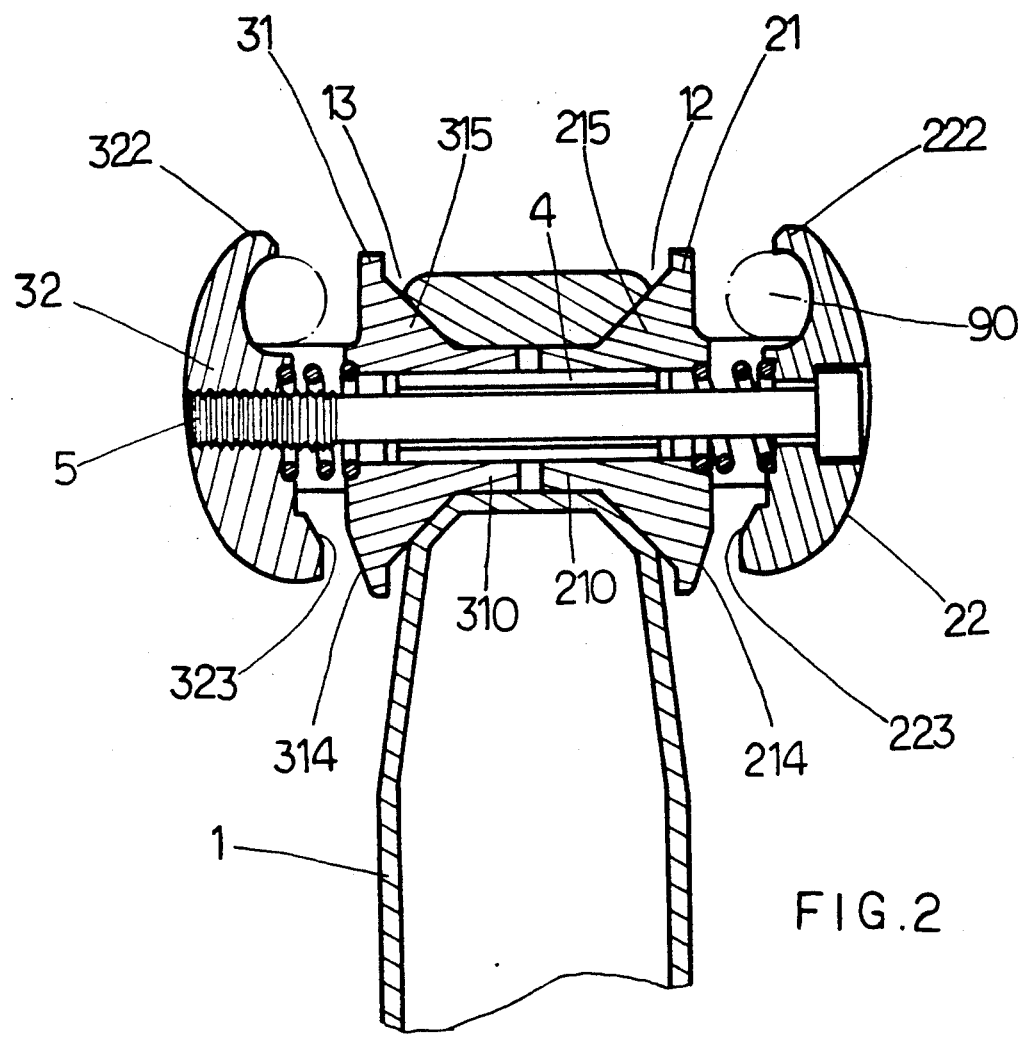
FIG. 2 is a cross sectional view of the saddle support mechanism.

Referring to the drawings, a saddle support mechanism in accordance with the present invention comprises a post 1 including a hole 11 laterally formed in the upper end thereof and having two ends each having a conical surface 12, 13 formed therein, two bases 21, 31 each including a square bore 211, 311 formed therein for engaging with a beam 4 of square cross section, a stub 210, 310 for engaging with the hole 11, a pair of ears 212, 213, 312, 313 extended in parallel with each other and extended away from the respective stub 210, 310 for supporting saddle wires 90 thereon, a tapered surface 214, 314 formed in the lower portion of the respective base 21, 31 and facing away from the respective stub 210, 310, a conical surface 215, 315 formed on each of the bases 21, 31 for engaging with the conical surfaces 12, 13 of the post 1, two clamping members 22, 32 each engaged between the respective ears 212, 213, 312, 313 of the respective base 21, 31, and each including a flange 222, 322 formed in the upper portion and a tapered surface 223, 323 formed in the lower portion, a bore 221 formed in the clamping member 22 and a screw hole 321 formed in the other clamping member 32 for engaging with a bolt 5, and two springs 23, 33 biased between the bases 21, 31 and the respective clamping members 22, 32, in which the bolt 5 extends through the bore 221, the springs 23, 33 and the beam 4 and threadedly engaged with the screw hole 321 of the clamping member 32 for forcing the clamping members 22, 32 toward each other against the biasing forces of the springs.

It is preferable that the end portions of the bores 211, 311 of the bases 21, 31 which are faced toward the springs 23, 33 have a circular shape and have a shoulder formed therein for engaging with the springs 23, 33 such that the springs 23, 33 can be stably retained in place.

In operation, the saddle frame or saddle wires 90 will be fixed between the respective bases 21, 31 and clamping members 22, 32. The clamping members 22, 32 will be caused to move downward relative to the bases when the clamping members 22, 32 are forced toward each other by the bolt 5 due to the engagements between the tapered surfaces 214, 223, and 314, 323, such that the flanges 222, 322 will be caused to move downward relative to the bases and will apply a downward fixing force onto the saddle wires 90, whereby, the saddle wires can be solidly fixed and retained in place.

Accordingly, the saddle support mechanism in accordance with the present invention includes a pair of clamping members which can be caused to move downward to force against the saddle wires in order to solidly retain the saddle wires in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saddle support mechanism comprising:

a post including a hole laterally formed therein and having two end portions, two bases each including a stub formed thereon for engaging with said end portions of said hole, and each including a pair of ears extended away from said post for supporting saddle wires thereon, each of said bases including a lower portion having a first tapered surface formed therein, two clamping members slidingly disposed between said ears of said bases respectively and each including an upper portion having a flange formed thereon for engaging with said saddle wires and a lower portion having a second tapered surface formed therein for engaging with said first tapered surfaces of said bases, a bolt engaged through said clamping members, said bases and said hole of said post in order to force said clamping members toward each other so as to fix said clamping members and said bases to said post, and means biased between said bases and said clamping members respectively, said clamping members being caused to move downward relative to said bases when said first tapered surfaces are engaged with said second tapered surfaces, respectively, and when said clamping members are forced toward each other by said bolt, whereby, said flanges of said clamping members are forced to move downward relative to said bases in order to fix said saddle wires in place.

2. A saddle support mechanism according to claim 1, wherein said stubs of said bases each include a square bore formed therein, a beam includes a square cross section for engaging with said square bores of said stubs.

3. A saddle support mechanism according to claim 1, wherein said end portions of said hole each include a first conical surface formed therein, each of said bases includes a second conical surface formed therein for engaging with said first conical surfaces, respectively.

* * * * *